Feb. 13, 1934.    O. U. ZERK    1,947,144
TIRE COVER
Original Filed July 23, 1931

INVENTOR
Oscar U. Zerk
BY Slough + Canfield
ATTORNEYS.

Patented Feb. 13, 1934

1,947,144

UNITED STATES PATENT OFFICE 1,947,144

TIRE COVER

Oscar U. Zerk, Cleveland, Ohio

Application July 23, 1931, Serial No. 552,636
Renewed July 31, 1933

12 Claims. (Cl. 150—54)

My invention relates generally to tire covers for spare tires of automobiles or other vehicles, and relates more particularly to tire covers which are resilient and flexible.

The tire covers of the prior art have uniformly been made of fabric or of metal. In my copending application, Serial No. 552,635, filed July 23, 1931, I have set forth the well known inconveniences, objections and disadvantages of such prior fabric tire covers and metal tire covers. Among the disadvantages therein set forth are that the fabric covers, being made of a number of pieces, fit the tire unevenly and present an unsightly appearance and are ill adapted to be taken up in size to accommodate them to the wear of a tire. Furthermore, the fabric covers cannot in a practical manner be made to fit the cover sufficiently closely to keep out moisture, dust and the like.

Among the objections to metal tire covers set forth in said application are the liability of the cover to be dented and otherwise mutilated and rendered unsightly upon even slight collisions therewith and even upon handling the covers in removing them from and replacing them on a tire.

In the above-mentioned pending application, I have shown and described a tire cover which overcomes these disadvantages, being made entirely of rubber. Such tire covers, as set forth in that application, may have the exposed surfaces thereof formed to present a pleasing appearance and, being of rubber, will retain their shape and appearance without mutilation under impacts of collision and other shocks, and the rubber being resilient, the tire cover may constrictingly grip the tire to be covered and retain itself securely on the tire and seal it against the ingress of dirt and moisture.

In the instant application I show and describe a tire cover made partly of rubber and partly of metal. As will appear hereinafter, rubber is employed in those parts which are exposed to collision and shock, and the constricting resilience of the rubber is employed to cause the tire cover to fit the tire and to retain it thereon, and metal is employed in other parts, preferably on the exposed circumferential surface to give the desired finish of metallic luster.

It is therefore an object of my invention to provide an improved tire cover having a rubber side portion and a metal circumferential portion, wherein the aesthetic properties of metal are suitably combined with the property of durability possessed by rubber.

Another object of my invention is to provide a composite rubber and metal tire cover wherein advantage is taken of the appearance of the metal and also of the durability and resiliency of the rubber.

Another object is to provide an improved tire cover comprising a rubber portion for covering and sealing the tire in combination with a metallic circumferential portion constrictingly clamped upon the rubber portion, and interfitting in an improved manner therewith.

Another object is to provide an improved tire cover having the most desirable properties of both rubber and metal, respectively.

Another object is to provide, in a tire cover having a split metallic circumferential portion, improved means for constrictingly securing the metal portion on the tire.

Another object of my invention is to provide an improved tire cover comprising a split circumferential metal portion and a rubber side portion, with improved means for interlocking the said portions together.

Another object is to constrictingly clamp a tire cover comprising a split circumferential metal portion and resilient side portions joined to the metal portion upon a tire to be covered, in an improved manner.

Another object is to provide a tire cover comprising a circumferential metal portion and a rubber side portion, the two portions adapted to be readily joined together by mutually engaging interlocking portions, in an improved manner.

Another object is to provide a tire cover comprising a rubber side portion and a metallic circumferential portion, the rubber portion being formed and finished to present a glossy appearance and the circumferential portion finished to present a metallic luster.

Other objects of my invention and the invention itself will become apparent by reference to the following description of certain embodiments of my invention, and the invention itself and the drawing illustrative of said embodiments, wherein.

Figure 1:
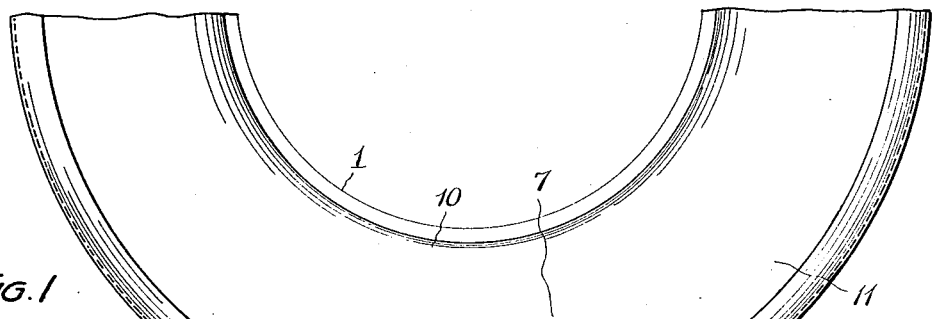
Fig. 1 illustrates a side elevational view of the improved tire cover of my invention in one embodiment thereof, the illustration showing the lower half of a tire and rim, and with a tire cover of rubber and metal thereon, and illustrating one means of clamping together the ends of the split circumferential metal portion of the cover.

Referring now to the figures of drawing in all of which, like parts are designated by like reference characters, I have shown at 1 in dotted lines, a tire rim generally of the straight side type in which is seated a tire 2 shown only in cross-sectional outline profile in dotted lines. The tire comprises the usual side walls 3—3 and tread 4. At 5 is illustrated a rubber portion of the tire cover of annular band form disposed circumferentially on the tread 4 of the tire. At the side edges of the tread portion 5, the cover continues inwardly radially in annular side portions 6 and 7, the annular side portion 6 extending inwardly only to a point of engagement with the tire 2 at its axially thickened portion as at 8, and the side portion 7 extending around the tire and into engagement with the bead portion 9 of the rim 1 as at 10.

The material of the rubber portion thus described which may be indicated generally at 11 is so formed that the tread portion 5 is of such diameter that it will constrictingly engage the tread of the tire, to a slight degree of tension when the tire is worn to its minimum diameter and consequently to a greater degree of tension when the tire is new; and the side portions 6 and 7 are formed so that they will engage the sides of the tire resiliently and constrictingly and the end 10 of the side portion 7 will engage the rim to effect a seal thereat to prevent ingress of water, dirt or the like deleterious substances into the interior of the cover.

The tire and the cover are mounted on the car preferably with the side 7 toward the rear, in which position it is visible to following motorists.

After the rubber portion 11 of the cover has been put in place as indicated and described above, a circumferential portion of metal, 12, is put on. The metal portion 12 is not a complete annulus but is split, the adjacent ends thereof being indicated at 13. The metal portion 12 does not resiliently constrictingly embrace the tire, but is formed of such diameter that it may readily be positioned telescopically over the tread portion 5 of the cover when in its normal relaxed condition. Then the ends 13 are constrictingly drawn together, as by a strap device, indicated generally at 14, and comprising a strap of leather or the like 15 riveted at one end as at 16 to one end of the metal portion 12 and engaged with a buckle 17 secured to the other end 13.

Figure 2:
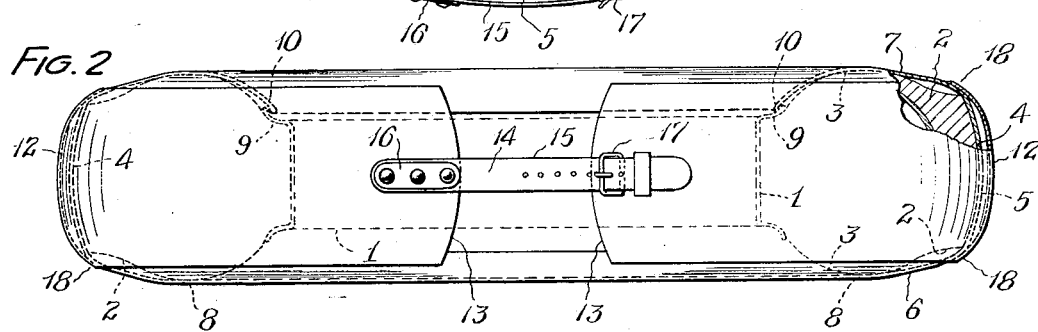
Fig. 2 is a bottom view of the embodiment of Fig. 1.

The metal portion 12, which, as shown by the above description, is an incomplete or "split" annulus, and is formed as shown in Fig. 2, in cross-section so that it may be disposed over the tread portion 4 of the rubber part of the cover, and may rest upon or engage the same only at the edges of the metal annulus as at 18—18, whereby, when the strap 15 is drawn up tight, the circumferential metal annulus portion 12 will be drawn tightly into engagement with the rubber portion to effect a close fitting finished appearance and to exclude dust, moisture, etc.

By means of the construction above described, a tire cover is provided which presents a smooth rubber surface when viewed from one side, for example, the side presented rearwardly when the tire is mounted on a rear of a motor car. This smooth rubber surface is not susceptible to being damaged in the event of a collision by a following car, and the rubber portion of the cover suitably seals itself against the tire rim for the purposes mentioned. Furthermore, the circumferential portion of the cover may present the ornamental appearance of polished metal and is so disposed that it is not liable to be damaged by collision.

Furthermore, in removing the tire cover, the metal portion may first be removed by unbuckling the strap 15 and, being in a single piece separate from the rest of the cover and the tire and rim, it may carefully be laid aside and kept safe from damage such as denting, abrasion and the like while the rubber portion of the cover is being removed and replaced on another tire.

Figure 3:
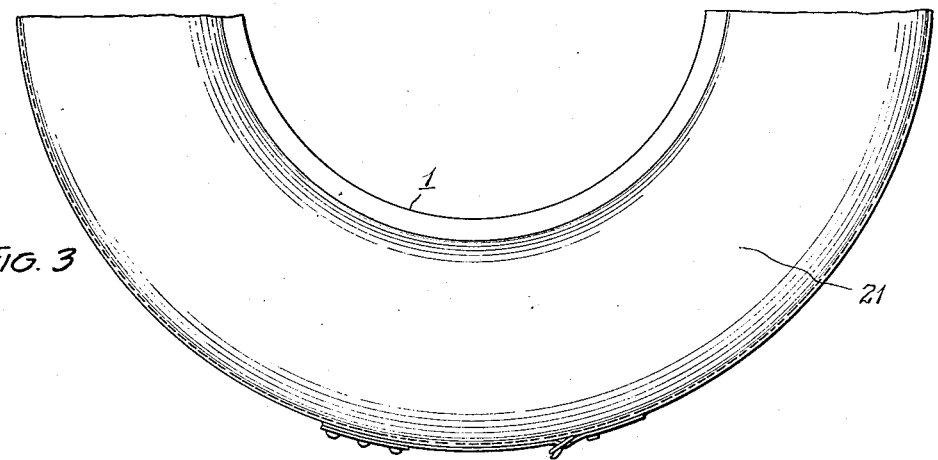
Fig. 3 is a view similar to Fig. 1 illustrating another embodiment of my invention.
Figure 4:
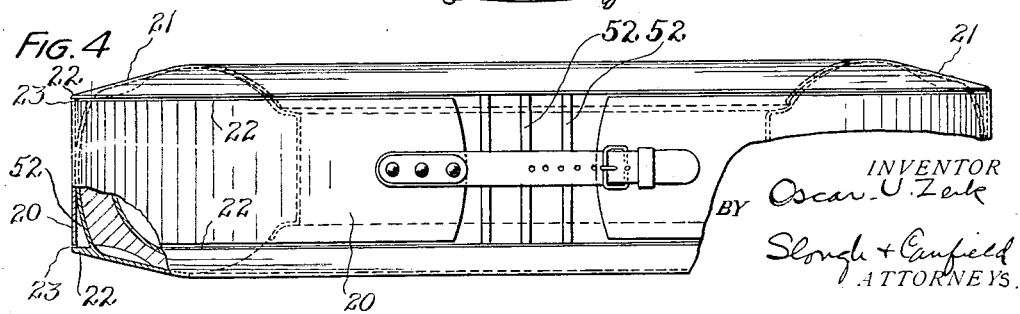
Fig. 4 is a bottom view of the tire and cover of Fig. 3.

In Figs. 3 and 4 I have shown an embodiment of my invention which is similar to the embodiment of Figs. 1 and 2, but differs therefrom in that the metal circumferential portion 20 is not of the arcuate cross-section of the corresponding portion 12 of Figs. 1 and 2, but is generally cylindrical. In order to make a close sealing fit between the circumferential metal portion 20 and the rubber portion which is shown generally at 21, the rubber is provided with circumferential upstanding ribs 22—22 suitably spaced apart, thus providing a wide circumferential groove and the metal portion 20 is disposed in the groove, the side edges 23—23 sealingly engaging the ribs 22—22.

In Fig. 4 I show at 52 a plurality of spaced parallel ribs formed integrally with the rubber cover and disposed interiorly of the metal band 20 which in this case is transversely straight rather than curved like that shown at 12 in Figs. 1 and 2. The ribs 52 are disposed between the side edge flanges 22 which extend radially beyond the ribs, whereby the ribs 52 support the straight metal cover 20, to prevent the metal band 20 from being distorted to a more or less transversely rounded or other undesired form.

It will be observed that in both of the forms above described, the rubber portion of the cover is completely annular and is stretched upon the tire to be covered, whereas the metal circumferential portions 12 and 20 are in each case split and are not complete annuli, and are put upon the tire externally of the rubber portion of the cover while in the relaxed state and are thereafter forceably resiliently drawn together at the split to clamp the annulus of metal on the rubber portion of the cover and on the outside thereof.

By the construction just described I provide a tire cover having rubber portions at the sides thereof sealing the rubber portions at the sides thereof in position to absorb without injury shocks of collision, and rough handling in changing the tire. I provide a cover which, by its inherent shape and resilience, seals itself on the tire and rim. Furthermore I provide a tire cover in which a metal portion of band form may be disposed circumferentially of the tire and which may be finished with a brilliant luster and which may be securely mounted on the tire and resiliently maintained thereon by the resilience of the rubber side portions and which need not be inherently resilient itself, nor of the exact size of the tire inasmuch as it engages the tire only by the channel portions thereof, and which metal tire portion, not of itself being constrictingly resilient to grip the tire, may easily be removed therefrom and applied thereto.

I claim:

1. A tire cover composed of resiliently flexible material of a size normally insufficient to receive therein the tire to be covered thereby and comprising a tread covering portion and side wall covering portions, said portions being resiliently distorted during placement on the tire and after positioning thereon, resiliently embracing the tire therewithin, and an outer band portion constrictingly engaging at least a portion of the tread covering portion of the cover, and annular ribs on the cover engaging the annular opposite edges of the band portion.

2. A tire cover comprising a rubber element having tire tread and tire side wall covering portions, and a metal strip constrictingly embracing the said tread covering portion, said strip held against displacement between bounding projections on said rubber element.

3. A tire cover comprising a rubber element having a tire tread and tire side wall covering portions, and a metal strip constrictingly embracing the said tread covering portion, said rubber element comprising means interfitted with said metal strip to hold the strip against relative axial displacement and said rubber element having a pair of annular outwardly extending flanges bounding its tread covering portion, said strip wedgingly interposed between said flanges.

4. A tire cover comprising a rubber element having tire tread and tire side wall covering portions, and a metal strip constrictingly embracing the said tread covering portion, said rubber element comprising means interfitted with said metal strip to hold the strip against relative axial displacement, said tread covering portion of said rubber element comprising spaced projections extending outwardly radially to engage the inner side of said strip.

5. A tire cover composed of resiliently flexible material of a size normally insufficient to receive therein the tire to be covered thereby and comprising a tread covering portion and side wall covering portions, said portions being resiliently distorted during placement on the tire and after positioning thereon, resiliently embracing the tire therewithin, an outer band portion constrictingly engaging at least a portion of the tread covering portion of the cover, said band portion engaging the tread covering portion upon a plurality of outwardly extending projections on the tire cover.

6. A tire cover composed of resiliently flexible material of a size normally insufficient to receive therein the tire to be covered thereby and comprising a tread covering portion and side wall covering portions, said portions being resiliently distorted during placement on the tire and after positioning thereon, resiliently embracing the tire therewithin, an outer band portion constrictingly engaging at least a portion of the tread covering portion of the cover, said band portion engaging the tread covering portion upon a plurality of transverse ribs formed on the cover.

7. A tire cover composed of resiliently flexible material of a size normally insufficient to receive therein the tire to be covered thereby and comprising a tread covering portion and side wall covering portions, said portions being resiliently distorted during placement on the tire and after positioning thereon, resiliently embracing the tire therewithin, an outer band portion constrictingly engaging at least a portion of the tread covering portion of the cover, said band portion engaging the tread covering portion upon a plurality of outwardly extending projections formed on the tread covering portion and in which annular ribs on the cover engage the lateral edges of the band portion.

8. A tire cover composed of resiliently flexible material of a size normally insufficient to receive therein the tire to be covered thereby and comprising a tread covering portion and side wall covering portions, said portions being resiliently distorted during placement on the tire and after positioning thereon, resiliently embracing the tire therewithin, and an outer split annulus band portion engaging the tread covering portion of the cover, and means for constrictingly drawing together the ends of the split annulus, said band portion engaging the tread covering portion upon a plurality of outwardly extending projections on the cover.

9. In a tire cover construction, an inner cover element composed of flexible material comprising a tread covering portion and side covering portions embracing portions of the tire to retain it thereon, an outer cover element comprising a separate strip of substantially rigid material constrictingly circumferentially embracing the tread covering portion of the inner cover element, and held against displacement by being interfitted with portions of the inner cover element.

10. A tire cover construction as described in claim 9, and in which the inner cover element is composed of rubber or like resilient material and resiliently embraces the tire therewithin.

11. A tire cover construction as described in claim 9 and in which the inner cover element is composed of rubber or like resilient material and resiliently embraces portions of the tire therewithin to retain it thereon and the outer cover element is composed of metal in the form of a split band and means is provided to constrictingly draw the ends of the band together.

12. A tire cover construction as described in claim 9 and in which the outer cover element covers substantially all of the tread covering portion of the inner cover element.

OSCAR U. ZERK.